United States Patent
Komiyama

(10) Patent No.: US 9,690,080 B2
(45) Date of Patent: Jun. 27, 2017

(54) WIDE ANGLE LENS

(71) Applicant: NIDEC SANKYO CORPORATION, Suwa-gun, Nagano (JP)

(72) Inventor: Tadashi Komiyama, Nagano (JP)

(73) Assignee: NIDEC SANKYO CORPORATION, Nagano (JP)

(*) Notice: Subject to any disclaimer, the term of this patent is extended or adjusted under 35 U.S.C. 154(b) by 0 days.

(21) Appl. No.: 14/824,482

(22) Filed: Aug. 12, 2015

(65) Prior Publication Data

US 2016/0077313 A1    Mar. 17, 2016

(30) Foreign Application Priority Data

Sep. 12, 2014   (JP) .................................. 2014-186037

(51) Int. Cl.
*G02B 13/04*    (2006.01)
*G02B 13/06*    (2006.01)
*G02B 9/60*     (2006.01)

(52) U.S. Cl.
CPC .............. *G02B 13/04* (2013.01); *G02B 9/60* (2013.01); *G02B 13/06* (2013.01)

(58) Field of Classification Search
CPC .......... G02B 13/04; G02B 13/06; G02B 9/60; G02B 9/62; G02B 9/64
USPC ................. 359/749–753, 754–756, 762, 770
See application file for complete search history.

(56) References Cited

U.S. PATENT DOCUMENTS

| 9,091,843 | B1* | 7/2015 | Hudyma | G02B 13/18 |
| 2006/0077564 | A1* | 4/2006 | Baba | G02B 13/02 |
| | | | | 359/680 |
| 2009/0002849 | A1* | 1/2009 | Kim | G02B 13/06 |
| | | | | 359/749 |
| 2011/0164324 | A1* | 7/2011 | Okumura | G02B 15/177 |
| | | | | 359/682 |
| 2011/0317278 | A1* | 12/2011 | Sato | G02B 15/177 |
| | | | | 359/682 |

FOREIGN PATENT DOCUMENTS

JP   2006-284620      * 10/2006
JP      5064154 B2    10/2012

* cited by examiner

*Primary Examiner* — Jordan Schwartz
(74) *Attorney, Agent, or Firm* — Cantor Colburn LLP

(57) ABSTRACT

A wide angle lens may include a first lens having a negative power with a convex surface on an object side and a concave surface on an image side, a second lens having a negative power with a concave surface on the image side, a third lens having a positive power with a convex surface on the image side, a fourth lens having a positive power with a convex surface on the image side, a fifth lens being a plastic lens with a negative power with a concave surface on the object side and a concave surface on the image side, a sixth lens being a plastic lens with a positive power with a convex surface on the object side and a convex surface on the image side, and a diaphragm disposed between the third and fourth lenses. The fifth and sixth lenses constitute a cemented lens.

9 Claims, 12 Drawing Sheets

| Surf | Radius | Thickness | Nd | νd | f |
|---|---|---|---|---|---|
| 1 | 12.250 | 1.300 | 1.773 | 49.6 | -6.242 |
| 2 | 3.300 | 1.770 | | | |
| 3* | 12.500 | 0.700 | 1.531 | 55.8 | -3.182 |
| 4* | 1.460 | 1.460 | | | |
| 5* | -3.060 | 1.630 | 1.580 | 30.3 | 9.370 |
| 6* | -2.340 | 0.430 | | | |
| 7(stop) | Infinity | 0.180 | | | |
| 8* | 3.800 | 1.570 | 1.619 | 63.9 | 2.838 |
| 9* | -2.75 | 0.290 | | | |
| 10* | -7.460 | 0.550 | 1.635 | 24.0 | -1.589 |
| 11* | 1.200 | 2.015 | 1.531 | 55.8 | 1.855 |
| 12* | -2.300 | 1.000 | | | |
| 13 | Infinity | 0.800 | 1.517 | 64.1 | |
| 14 | Infinity | 0.243 | | | |

Aspherical Coefficient

| Surf | c (1/Radius) | K | A4 | A6 | A8 | A10 |
|---|---|---|---|---|---|---|
| 3 | 8.00000E-02 | 0.00000E+00 | -1.79000E-03 | 3.36000E-04 | -2.00000E-06 | 0.00000E+00 |
| 4 | 6.84932E-01 | -8.00000E-02 | -1.25000E-02 | -2.40000E-03 | 2.65000E-03 | -1.47000E-03 |
| 5 | -3.26797E-01 | 0.00000E+00 | -3.12000E-02 | 8.70000E-04 | -7.00000E-03 | 1.73000E-03 |
| 6 | -4.27350E-01 | 0.00000E+00 | -1.12000E-02 | 3.43000E-03 | -1.91000E-04 | 0.00000E+00 |
| 8 | 2.63158E-01 | 0.00000E+00 | -1.67000E-02 | 2.29000E-03 | 0.00000E+00 | 0.00000E+00 |
| 9 | -3.63636E-01 | 0.00000E+00 | 3.71000E-03 | 1.08000E-03 | 9.00000E-04 | 0.00000E+00 |
| 10 | -1.34048E-01 | 0.00000E+00 | -1.22000E-02 | 2.68000E-03 | 1.89000E-03 | -2.00000E-04 |
| 11 | 8.33333E-01 | -8.50000E-01 | -4.62000E-03 | -1.36000E-02 | 3.80000E-03 | -8.64000E-04 |
| 12 | -4.34783E-01 | -2.30000E+00 | -1.24000E-03 | 2.27000E-03 | -1.24000E-03 | 7.33000E-04 |

| Surf | Radius | Thickness | Nd | νd | f |
|---|---|---|---|---|---|
| 1 | 16.663 | 1.300 | 1.491 | 58.0 | -9.782 |
| 2* | 3.632 | 1.824 | | | |
| 3* | 37.569 | 0.700 | 1.531 | 55.8 | -2.683 |
| 4* | 1.364 | 1.425 | | | |
| 5* | -2.961 | 1.609 | 1.583 | 30.2 | 10.006 |
| 6* | -2.356 | 0.076 | | | |
| 7(stop) | Infinity | 0.592 | | | |
| 8* | 3.017 | 1.377 | 1.531 | 55.8 | 2.793 |
| 9* | -2.456022 | 0.128 | | | |
| 10* | -8.638 | 0.600 | 1.635 | 24.0 | -1.522 |
| 11* | 1.118 | 2.396 | 1.531 | 55.8 | 1.832 |
| 12* | -1.929 | 0.900 | | | |
| 13 | Infinity | 0.800 | 1.517 | 64.1 | |
| 14 | Infinity | 0.255 | | | |

Aspherical Coefficient

| Surf | c (1/Radius) | K | A4 | A6 | A8 | A10 |
|---|---|---|---|---|---|---|
| 2 | 2.75339E-01 | -2.09656E-01 | 0.00000E+00 | 0.00000E+00 | 0.00000E+00 | 0.00000E+00 |
| 3 | 2.66178E-02 | 0.00000E+00 | 7.61327E-04 | 1.97410E-04 | -1.02146E-05 | 0.00000E+00 |
| 4 | 7.33027E-01 | -4.73602E-02 | -2.38700E-02 | 6.96442E-03 | -1.60246E-03 | -1.71757E-03 |
| 5 | -3.37722E-01 | 0.00000E+00 | -2.72708E-02 | 6.16359E-03 | -9.93442E-03 | 3.67585E-03 |
| 6 | -4.24399E-01 | 0.00000E+00 | -9.55927E-03 | 3.24144E-03 | 8.92673E-04 | 0.00000E+00 |
| 8 | 3.31506E-01 | 0.00000E+00 | -1.48016E-02 | 8.79018E-04 | 0.00000E+00 | 0.00000E+00 |
| 9 | -4.07162E-01 | 0.00000E+00 | 1.54134E-02 | -4.36050E-04 | 5.24905E-04 | 0.00000E+00 |
| 10 | -1.15772E-01 | 0.00000E+00 | -1.25678E-02 | 1.85272E-03 | 1.11045E-03 | -1.39342E-04 |
| 11 | 8.94749E-01 | -7.71936E-01 | -3.52484E-02 | -5.10980E-03 | -1.53618E-03 | 2.86775E-04 |
| 12 | -5.18533E-01 | -2.23975E+00 | 3.09188E-03 | -2.53948E-03 | 8.89385E-04 | 2.82724E-04 |

| Surf | Radius | Thickness | Nd | νd | f |
|---|---|---|---|---|---|
| 1 | 15.633 | 1.300 | 1.773 | 49.6 | -7.641 |
| 2 | 4.130 | 1.840 | | | |
| 3* | 10.386 | 0.700 | 1.531 | 55.8 | -3.983 |
| 4* | 1.716 | 2.458 | | | |
| 5* | -3.420 | 1.451 | 1.635 | 24.0 | 9.321 |
| 6* | -2.524 | 0.563 | | | |
| 7(stop) | Infinity | 0.241 | | | |
| 8* | 5.199 | 1.701 | 1.619 | 63.9 | 3.565 |
| 9* | -3.351871 | 0.408 | | | |
| 10* | -9.029 | 0.550 | 1.635 | 24.0 | -1.836 |
| 11* | 1.370 | 3.015 | 1.531 | 55.8 | 2.264 |
| 12* | -2.327 | 1.100 | | | |
| 13 | Infinity | 0.800 | 1.517 | 64.1 | |
| 14 | Infinity | 0.206 | | | |

Aspherical Coefficient

| Surf | c (1/Radius) | K | A4 | A6 | A8 | A10 |
|---|---|---|---|---|---|---|
| 3 | 9.62796E-02 | 0.00000E+00 | -1.52118E-03 | 1.78621E-04 | -4.73233E-06 | 0.00000E+00 |
| 4 | 5.82622E-01 | -2.73431E-01 | -8.64043E-03 | 4.42845E-04 | -2.28123E-04 | 0.00000E+00 |
| 5 | -2.92425E-01 | 0.00000E+00 | -1.94474E-02 | -2.05881E-03 | 3.05495E-04 | 0.00000E+00 |
| 6 | -3.96133E-01 | 0.00000E+00 | -9.59449E-04 | 9.28759E-04 | 8.39264E-05 | 0.00000E+00 |
| 8 | 1.92338E-01 | 0.00000E+00 | -3.30335E-04 | 2.02947E-03 | 0.00000E+00 | 0.00000E+00 |
| 9 | -2.98341E-01 | 0.00000E+00 | 7.55554E-03 | 1.77212E-03 | 3.75487E-04 | 0.00000E+00 |
| 10 | -1.10749E-01 | 0.00000E+00 | -6.21655E-03 | 2.37043E-03 | -8.01264E-05 | 0.00000E+00 |
| 11 | 7.29881E-01 | -8.80239E-01 | -3.01977E-03 | -2.06356E-03 | 5.42679E-04 | 0.00000E+00 |
| 12 | -4.29812E-01 | -2.85574E+00 | -3.65379E-03 | 1.12960E-04 | 1.28529E-04 | 0.00000E+00 |

0°

20.23°

39.42°

67.71°

76.79°

96.34°

| Surf | Radius | Thickness | Nd | νd | f |
|---|---|---|---|---|---|
| 1 | 15.468 | 1.300 | 1.773 | 49.6 | -6.493 |
| 2 | 3.649 | 1.279 | | | |
| 3* | 5.780 | 0.700 | 1.531 | 55.8 | -4.777 |
| 4* | 1.689 | 2.447 | | | |
| 5* | -3.445 | 1.483 | 1.635 | 24.0 | 9.393 |
| 6* | -2.549 | 0.518 | | | |
| 7(stop) | Infinity | 0.294 | | | |
| 8* | 5.265 | 1.733 | 1.619 | 63.9 | 3.579 |
| 9* | -3.341 | 0.368 | | | |
| 10* | -9.759 | 0.550 | 1.635 | 24.0 | -1.914 |
| 11* | 1.418 | 2.970 | 1.531 | 55.8 | 2.311 |
| 12* | -2.498 | 1.000 | | | |
| 13 | Infinity | 0.800 | 1.517 | 64.1 | |
| 14 | Infinity | 0.320 | | | |

Aspherical Coefficient

| Surf | c (1/Radius) | K | A4 | A6 | A8 | A10 |
|---|---|---|---|---|---|---|
| 3 | 1.73018E-01 | 0.00000E+00 | -1.09371E-03 | 8.96067E-05 | 6.79808E-07 | 0.00000E+00 |
| 4 | 5.92055E-01 | -3.69067E-01 | -5.46149E-03 | 5.33491E-05 | 3.24048E-05 | 0.00000E+00 |
| 5 | -2.90235E-01 | 0.00000E+00 | -1.48101E-02 | -1.55558E-03 | -2.60943E-05 | 0.00000E+00 |
| 6 | -3.92339E-01 | 0.00000E+00 | 1.72912E-03 | 1.38909E-04 | 1.25643E-04 | 0.00000E+00 |
| 8 | 1.89948E-01 | 0.00000E+00 | -1.80517E-04 | -1.34657E-04 | 0.00000E+00 | 0.00000E+00 |
| 9 | -2.99302E-01 | 0.00000E+00 | 3.83487E-03 | 5.76953E-04 | 1.46169E-04 | 0.00000E+00 |
| 10 | -1.02466E-01 | 0.00000E+00 | -7.94964E-03 | 1.27201E-03 | 2.80342E-04 | 0.00000E+00 |
| 11 | 7.05129E-01 | -9.33546E-01 | -3.01901E-03 | -2.10878E-03 | 1.13519E-03 | 0.00000E+00 |
| 12 | -4.00346E-01 | -2.73434E+00 | 2.78394E-04 | 2.34199E-04 | 1.36198E-04 | 0.00000E+00 |

0°

19.93°

36.69°

53.86°

68.38°

93.11°

WIDE ANGLE LENS

CROSS REFERENCE TO RELATED APPLICATION

The present invention claims priority under 35 U.S.C. §119 to Japanese Application No. 2014-186037 filed Sep. 12, 2014, the entire content of which is incorporated herein by reference.

FIELD OF THE INVENTION

At least an embodiment of the present invention may relate to a wide angle lens which is used in various image pickup systems.

BACKGROUND

A lens which is mounted on a monitoring camera, an on-vehicle camera and a camera for a portable apparatus is required to have a viewing angle of 90° or more and to reduce aberration so as to attain sufficient resolution. Further, in a lens constitution of four groups having five lenses, a structure has been proposed that a diaphragm is disposed between the third group and the fourth group and a cemented lens obtained by cementing plastic lenses together is disposed as the fourth group to a rear side (image side) of the diaphragm at a position adjacent to the diaphragm and thereby reduction of cost and improvement of chromatic aberration are attempted (see Japanese Patent No. 5,064,154).

However, even when a cemented lens is disposed to a rear side (image side) of a diaphragm at a position adjacent to the diaphragm like the wide angle lens described in the above-mentioned Patent Literature, other aberration remains and resolution is deteriorated. Further, when a cemented lens is disposed to a rear side of a diaphragm, the absolute value of a radius of curvature of the cemented faces becomes extremely small and thus manufacturing of lenses used for the cemented lens and cementing of the lenses are not performed stably.

SUMMARY

In view of the problem described above, at least an embodiment of the present invention may advantageously provide a wide angle lens which is capable of reducing various aberrations even when a cemented lens is disposed to an image side of a diaphragm and whose absolute value of a radius of curvature of cemented faces of lenses structuring a cemented lens can be relatively increased.

According to at least an embodiment of the present invention, there may be provided a wide angle lens with a lens constitution of five groups having six lenses. The wide angle lens comprises a first lens which is a first lens from an object side whose convex surface is directed to the object side and its concave surface is directed to an image side, the first lens having a negative power, a second lens which is a second lens from the object side whose concave surface is directed to the image side, the second lens having a negative power, a third lens which is a third lens from the object side whose convex surface is directed to the image side, the third lens having a positive power, a fourth lens which is a fourth lens from the object side whose convex surface is directed to the image side, the fourth lens having a positive power, a fifth lens which is a fifth lens from the object side whose concave surface is directed to the object side and its concave surface is directed to the image side, the fifth lens being a plastic lens having a negative power, a sixth lens which is a sixth lens from the object side whose convex surface is directed to the object side and its convex surface is directed to the image side, the sixth lens being a plastic lens having a positive power, and a diaphragm which is disposed between the third lens and the fourth lens. The fifth lens and the sixth lens constitute a cemented lens.

According to at least an embodiment of the present invention, shapes and refracting powers of the respective lenses are set to be appropriate. Further, the fourth lens having a positive power is disposed to the rear side of the diaphragm and thus, even at a wide angle, magnification chromatic aberration, field curvature aberration, distortion aberration, comatic aberration, astigmatism and the like can be corrected. Further, since the fourth lens having a positive power is disposed to the rear side of the diaphragm, an incident angle to the image plane can be suppressed small. Therefore, a high-pixel imaging element can be utilized. In addition, the fifth group is a cemented lens of the fifth lens having both concave surfaces and the sixth lens having both convex surfaces and thus, it is advantageous to correct magnification chromatic aberration. Therefore, generation of magnification chromatic aberration resulting from a wider angle can be suppressed. Also in this case, the fourth lens is disposed between the diaphragm and the cemented lens and thus the absolute value of a radius of curvature of the cemented face of a plastic lens constituting the cemented lens can be made relatively large. Therefore, the cemented lens is easily manufactured.

In at least an embodiment of the present invention, when an effective focal length is "f0", a focal length of the third lens is "f3", and a focal length of the fifth lens is "f5", both of the following conditions (1) and (2) are satisfied.

$6 < f3/f0 < 12$            Condition (1)

$-1.5 < f5/f0 < -1$            Condition (2)

In the condition (1), when "f3/f0" is 6 (lower limit) or less, a negative power of the third lens becomes weak. Therefore, the absolute value of a radius of curvature of the second lens becomes small and thus the second lens is hard to be manufactured. On the other hand, when "f3/f0" is 12 (upper limit) or more, chromatic aberration is hard to be corrected. Further, when the condition (2) is not satisfied, chromatic aberration is hard to be corrected. Therefore, when the conditions (1) and (2) are satisfied, the second lens is easy to be manufactured and, in addition, chromatic aberration is easy to be corrected.

In at least an embodiment of the present invention, when an Abbe number of the third lens is "v3" and an Abbe number of the fourth lens is "v4", both of the following conditions (3) and (4) are satisfied.

$v3 \leq 35$            Condition (3)

$v4 \geq 50$            Condition (4)

According to this structure, chromatic aberration is easy to be corrected.

In at least an embodiment of the present invention, the fourth lens is a glass lens. According to this structure, lowering of resolution and change of an image height due to temperature change can be suppressed.

In at least an embodiment of the present invention, a concave surface of the third lens is directed to the object side. According to this structure, chromatic aberration is easy to be corrected.

In at least an embodiment of the present invention, when an object-image distance from a face on the object side of the first lens to an imaging element is "D", the following condition (5) is satisfied.

10<D/f0<15    Condition (5)

When "D/f0" is 10 (lower limit) or less, it is disadvantageous to attain a wide angle. Further, when "D/f0" is 15 (upper limit) or more, the size of the wide angle lens is increased. Therefore, when the condition (5) is satisfied, it is advantageous to constitute a small wide angle lens.

In at least an embodiment of the present invention, when an Abbe number of the fifth lens is "ν5" and an Abbe number of the sixth lens is "ν6", both of the following conditions (6) and (7) are satisfied.

ν5≤35    Condition (6)

νν6≥40    Condition (7)

According to this structure, chromatic aberration is easy to be corrected.

In at least an embodiment of the present invention, a horizontal viewing angle of the wide angle lens is 130° or more.

Other features and advantages of the invention will be apparent from the following detailed description, taken in conjunction with the accompanying drawings that illustrate, by way of example, various features of embodiments of the invention.

BRIEF DESCRIPTION OF THE DRAWINGS

Embodiments will now be described, by way of example only, with reference to the accompanying drawings which are meant to be exemplary, not limiting, and wherein like elements are numbered alike in several Figures, in which.

DETAILED DESCRIPTION OF THE PREFERRED EMBODIMENTS

Embodiments of a wide angle lens to which the present invention is applied will be described below with reference to the accompanying drawings.

[First Embodiment]

Figures 1A, 1B, 1C:
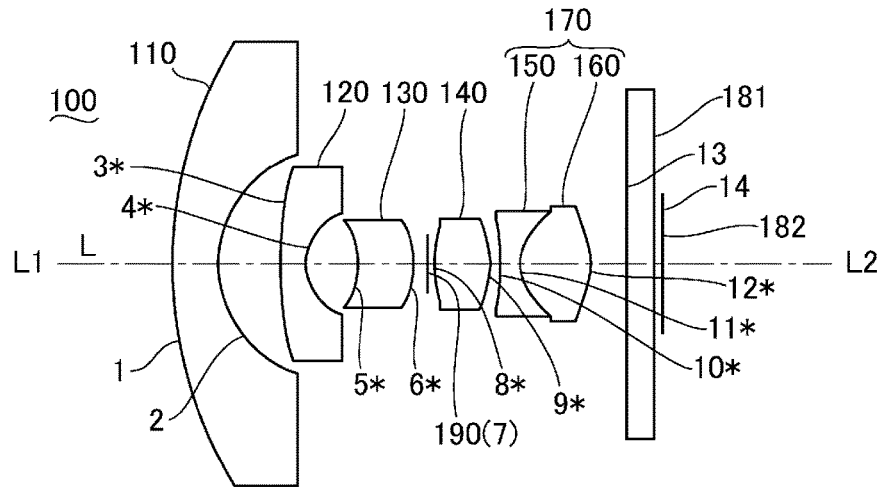
FIGS. 1A, 1B and 1C are explanatory views showing a wide angle lens in accordance with a first embodiment of the present invention.
Figure 2A:
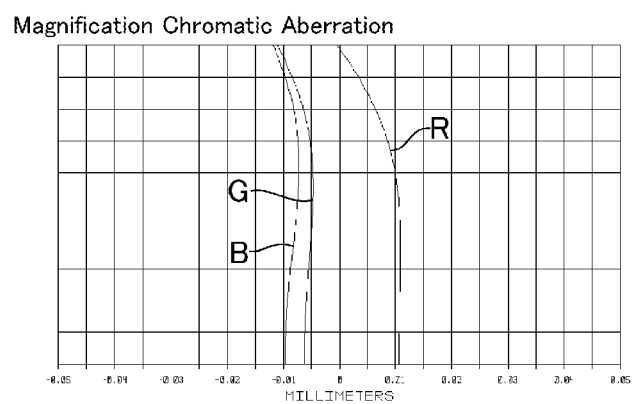
FIGS. 2A, 2B and 2C are explanatory views showing aberrations of a wide angle lens in accordance with the first embodiment of the present invention.
Figure 2B:
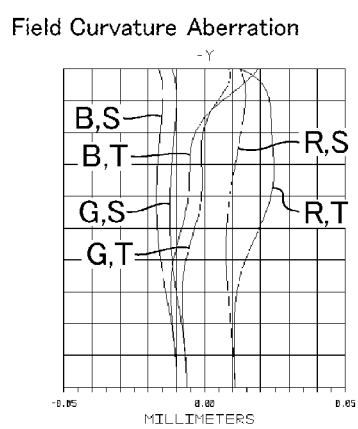
Figure 2C:
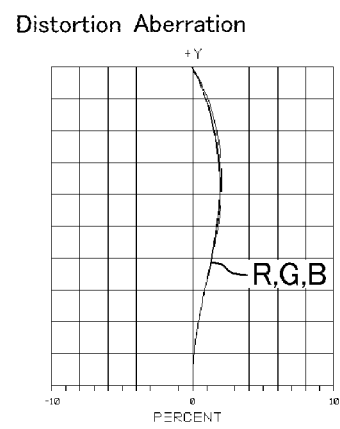
Figure 3A:
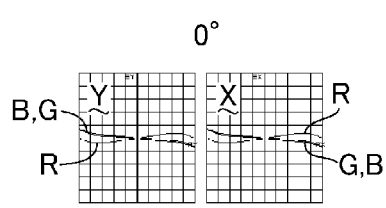
FIGS. 3A, 3B, 3C, 3D and 3E are explanatory views showing lateral aberrations of a wide angle lens in accordance with the first embodiment of the present invention.
Figure 3B:
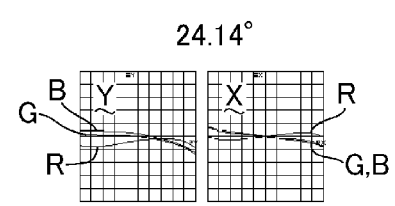
Figure 3C:
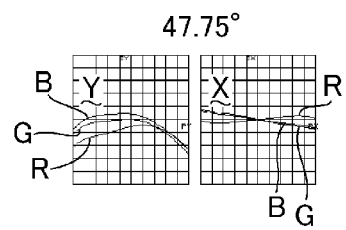
Figure 3D:
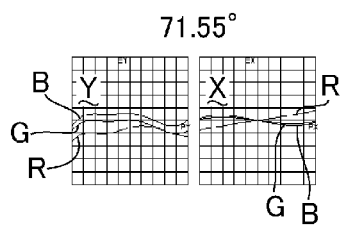
Figure 3E:
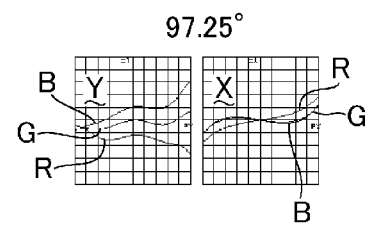

FIGS. 1A, 1B and 1C are explanatory views showing a wide angle lens in accordance with a first embodiment of the present invention. FIG. 1A is an explanatory view showing a lens constitution, FIG. 1B is an explanatory view showing physical properties of respective faces, and FIG. 1C is an explanatory view showing aspherical coefficients of respective faces. FIGS. 2A, 2B and 2C are explanatory views showing aberrations of a wide angle lens in accordance with the first embodiment of the present invention. FIG. 2A is an explanatory view showing a magnification chromatic aberration, FIG. 2B is an explanatory view showing a field curvature aberration, and FIG. 2C is an explanatory view showing a distortion aberration. FIGS. 3A, 3B, 3C, 3D and 3E are explanatory views showing lateral aberrations of a wide angle lens in accordance with the first embodiment of the present invention. FIGS. 3A, 3B, 3C, 3D and 3E show lateral aberrations in a tangential direction ("Y" direction) and a sagittal direction ("X" direction) at angles of 0°, 24.14°, 47.75°, 71.55° and 97.25° with respect to an optical axis.

In FIGS. 1A and 1B, the mark "*" denotes an aspherical surface. Further, in FIG. 1B, the following items of respective faces, i.e., a radius of curvature (Radius), thickness, a refractive index "Nd", an Abbe number "νd" and a focal length "f" are shown. In FIG. 1C, aspherical coefficients "A4", "A6", "A8" and "A10" are indicated when a shape of an aspherical surface is expressed by the following expression (Expression 1).

$$Z = \frac{cr^2}{1+\sqrt{1-(1+K)c^2r^2}} + \sum_{n=1}^{5} A_{2n}r^{2n} \quad \text{[Expression 1]}$$

In the above-mentioned Expression 1, "Z" is an axis in an optical axis direction, "r" is a height in a direction perpendicular to the optical axis, "K" is a conical coefficient, and "c" is an inverse number of the radius of curvature. Further, the units of the radius of curvature, the thickness, the focal length and the like are "mm".

In FIGS. 2A, 2B and 2C and FIGS. 3A, 3B, 3C, 3D and 3E, respective chromatic aberrations of red light "R" (wave length 486 nm), green light "G" (wave length 588 nm), and blue light "B" (wave length 656 nm) are shown with "R", "G" and "B". Further, in FIG. 2B, "S" is added for the characteristic in a sagittal direction and "T" is added to the characteristic in a tangential direction. Figures described below will be similarly indicated.

As shown in FIG. 1A, a wide angle lens 100 in this embodiment is provided with a lens constitution of five groups having six lenses and its horizontal viewing angle is 130° or more. More specifically, in the wide angle lens 100, a first lens 110, a second lens 120, a third lens 130, a diaphragm 190, a fourth lens 140, a fifth lens 150 and a sixth lens 160 are disposed along an optical axis "L" from an object side "L1" to an image side "L2". The diaphragm 190 constitutes a seventh face 7. Further, a filter 181 and an imaging element 182 are disposed to an image side "L2" of the sixth lens 160. The filter 181 and the imaging element 182 constitute a thirteenth face 13 and a fourteenth face 14.

The first lens 110 which is a first lens from the object side "L1" is a lens having a negative power with a convex surface (first face 1) on the object side "L1" and a concave surface (second face 2) on the image side "L2". In this embodiment, the first lens 110 is a glass lens whose first face 1 and second face 2 are spherical surfaces.

The second lens 120 which is a second lens from the object side "L1" is a lens having a negative power with a concave surface (fourth face 4) on the image side "L2". In this embodiment, a convex surface (third face 3) of the second lens 120 is directed to the object side "L1" and the second lens 120 is a plastic lens whose third face 3 and fourth face 4 are aspherical surfaces.

The third lens 130 which is a third lens from the object side "L1" is a lens having a positive power with a convex surface (sixth face 6) on the image side "L2". In this embodiment, a concave surface (fifth face 5) of the third lens 130 is directed to the object side "L1", and the third lens 130 is a plastic lens whose fifth face 5 and sixth face 6 are aspherical surfaces.

The fourth lens 140 which is a fourth lens from the object side "L1" is a lens having a positive power with a convex surface (ninth face 9) on the image side "L2". In this embodiment, a convex surface (eighth face 8) of the fourth lens 140 is directed to the object side "L1", and the fourth lens 140 is a glass lens whose eighth face 8 and ninth face 9 are aspherical surfaces.

The fifth lens 150 which is a fifth lens from the object side "L1" is a plastic lens having a negative power with a concave surface (tenth face 10) on the object side "L1" and a concave surface (eleventh face 11) on the image side "L2". The fifth lens 150 constitutes a cemented lens 170 together with the sixth lens 160 which is a sixth lens from the object side "L1".

The sixth lens 160 is a plastic lens having a positive power with a convex surface (eleventh face 11) on the object side "L1" and a convex surface (twelfth face 12) on the image side "L2". In this embodiment, the tenth face 10, the eleventh face 11 and the twelfth face 12 of the cemented lens 170 (fifth lens 150 and sixth lens 160) are aspherical surfaces.

Respective faces ("Surf") are constituted as shown in FIGS. 1B and 1C. In the wide angle lens 100, an effective focal length "f0" of the entire lens system is 1.062 mm, and an object-image distance "D" (Total Track) from the face (first face 1) on the object side "L1" of the first lens 110 to the imaging element 182 is 13.938 mm. Further, the "F"-value (Image Space) of the wide angle lens 100 is 2.0, the maximum viewing angle (Max. Field Angle) is 208°, and the horizontal viewing angle (Horizontal Field Angle) is 195°.

Further, the wide angle lens 100 satisfies the following conditions (1) through (5). First, the effective focal length "f0", a focal length "f3" of the third lens 130 and a focal length "f5" of the fifth lens 150 are respectively 1.062 mm, 9.370 mm and −1.589 mm. Therefore, "f3/f0" is 8.823 and "f5/f0" is −1.496. Accordingly, both of the following conditions (1) and (2) are satisfied.

$$6 < f3/f0 < 12 \quad \text{Condition (1)}$$

$$-1.5 < f5/f0 < -1 \quad \text{Condition (2)}$$

In the condition (1), when "f3/f0" is 6 (lower limit) or less, a negative power of the third lens 130 becomes weak. Therefore, the absolute value of a radius of curvature of the second lens 120 becomes small and thus the second lens 120 is hard to be manufactured. On the other hand, when "f3/f0" is 12 (upper limit) or more, chromatic aberration is hard to be corrected. Further, when the condition (2) is not satisfied, chromatic aberration is hard to be corrected. Therefore, in this embodiment, the conditions (1) and (2) are satisfied and thus the second lens 120 is easy to be manufactured and, in addition, chromatic aberration is easy to be corrected.

Further, the Abbe number "ν3" of the third lens 130 and the Abbe number "ν4" of the fourth lens 140 are respectively 30.3 and 63.9. Therefore, both of the following conditions (3) and (4) are satisfied.

$$\nu 3 \leq 35 \quad \text{Condition (3)}$$

$$\nu 4 \geq 50 \quad \text{Condition (4)}$$

Accordingly, in this embodiment, chromatic aberration is easy to be corrected.

Further, the object-image distance "D" is 13.938 mm and thus "D/f0" is 13.124. Therefore, the following condition (5) is satisfied.

$$10 < D/f0 < 15 \quad \text{Condition (5)}$$

When "D/f0" is 10 (lower limit) or less, it is disadvantageous to attain a wide angle. Further, when "D/f0" is 15 (upper limit) or more, the size of the wide angle lens 100 is increased. Therefore, when the condition (5) is satisfied, it is advantageous to constitute a small wide angle lens 100.

Further, the Abbe number "ν5" of the fifth lens 150 and the Abbe number "ν6" of the sixth lens 160 are respectively 24.0 and 55.8. Therefore, both of the following condition (6) and condition (7) are satisfied.

$$\nu 5 \leq 35 \quad \text{Condition (6)}$$

$$\nu 6 \geq 40 \quad \text{Condition (7)}$$

Therefore, chromatic aberration is easy to be corrected.

Further, since a concave surface (tenth face 10) of the fifth lens 150 is directed to the object side "L1", the chromatic aberration is easy to be corrected.

The aberrations (magnification chromatic aberration, field curvature aberration, distortion aberration and lateral aberration) of the wide angle lens 100 in this embodiment are shown in FIGS. 2A, 2B and 2C and FIGS. 3A, 3B, 3C, 3D and 3E. The aberrations are reduced in a sufficient level. In other words, according to this embodiment, shapes and refracting powers of the respective lenses are set to be appropriate. Further, the fourth lens 140 having a positive power is disposed to the rear side (image side "L2") of the diaphragm 190 and at a position adjacent to the diaphragm 190 and thus, even at a wide angle, comatic aberration, astigmatism, chromatic aberration and the like can be corrected. Further, since the fourth lens 140 having a positive power is disposed to the rear side (image side "L2") of the diaphragm 190 and at a position adjacent to the diaphragm 190, an incident angle to the image plane can be suppressed small. Therefore, a high-pixel imaging element 182 can be utilized.

In addition, the fifth group is the cemented lens 170 of the fifth lens 150 having both concave surfaces and the sixth lens 160 having both convex surfaces and thus, it is advantageous to correct magnification chromatic aberration. Therefore, generation of magnification chromatic aberration resulting from a wider angle can be suppressed. Also in this case, the fourth lens 140 is disposed between the diaphragm 190 and the cemented lens 170 and thus the absolute value of a radius of curvature of the cemented face (eleventh face 11) of a plastic lens (fifth lens 150 and sixth lens 160) constituting the cemented lens 170 can be made relatively large. Therefore, the cemented lens 170 is easily manufactured.

Further, in the wide angle lens 100 in this embodiment, the fourth lens 140 disposed to the rear side (image side "L2") of the diaphragm 190 and at a position adjacent to the diaphragm 190 is a glass lens. Therefore, lowering of resolution and change of an image height due to temperature change can be suppressed.

[Second Embodiment]

Figures 4A, 4B, 4C:
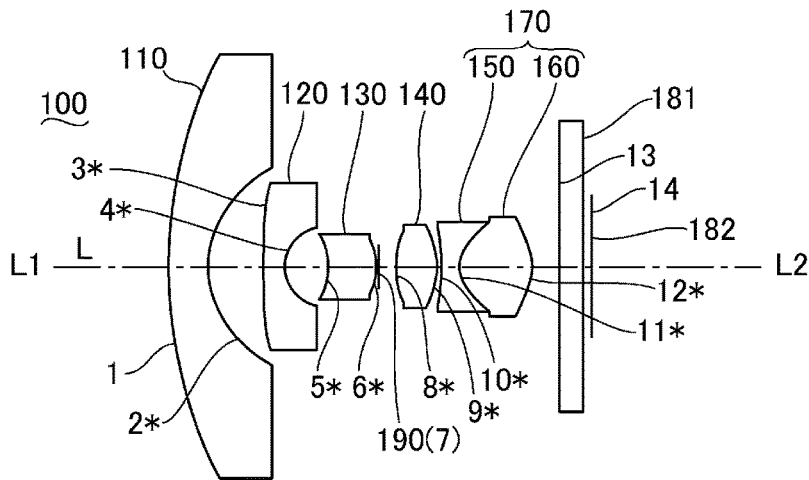
FIGS. 4A, 4B and 4C are explanatory views showing a wide angle lens in accordance with a second embodiment of the present invention.
Figure 5A:
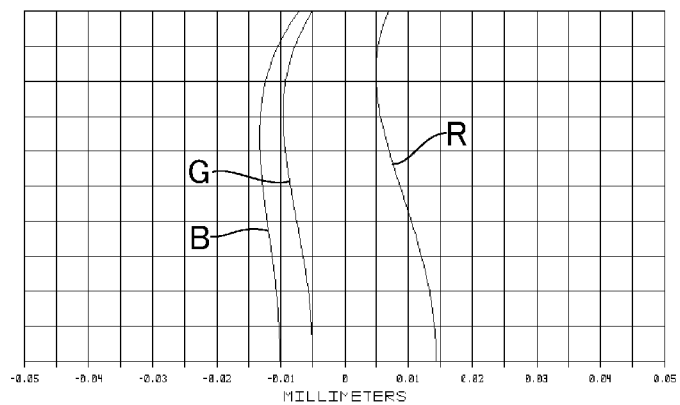
FIGS. 5A, 5B and 5C are explanatory views showing aberrations of a wide angle lens in accordance with the second embodiment of the present invention.
Figure 5B:
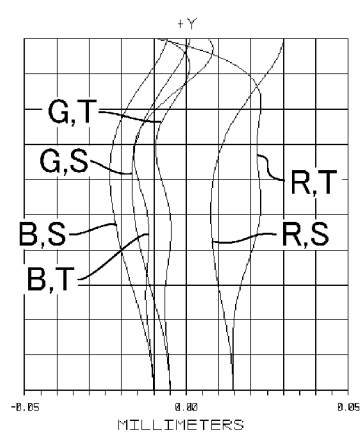
Figure 5C:
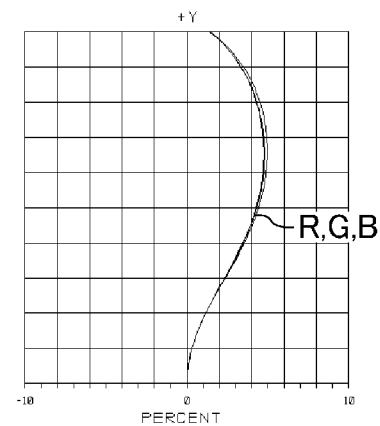
Figure 6A:
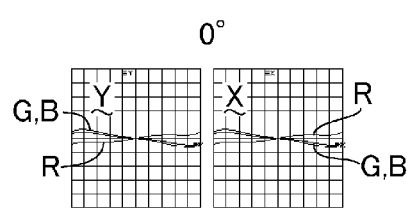
FIGS. 6A, 6B, 6C, 6D and 6E are explanatory views showing lateral aberrations of a wide angle lens in accordance with the second embodiment of the present invention.
Figure 6B:
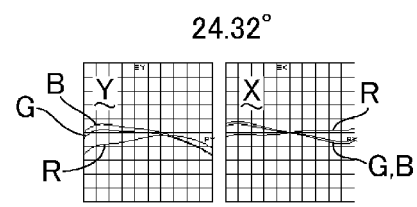
Figure 6C:
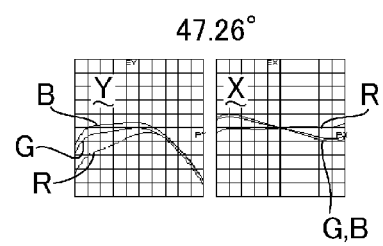
Figure 6D:
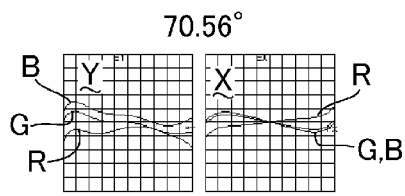
Figure 6E:
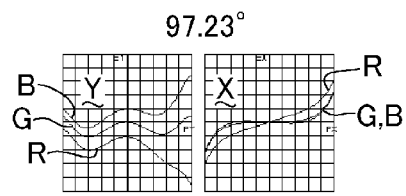

FIGS. 4A, 4B and 4C are explanatory views showing a wide angle lens in accordance with a second embodiment of the present invention. FIG. 4A is an explanatory view showing a lens constitution, FIG. 4B is an explanatory view showing physical properties of respective faces and FIG. 4C is an explanatory view showing aspherical coefficients of respective faces. FIGS. 5A, 5B and 5C are explanatory views showing aberrations of a wide angle lens in accordance with the second embodiment of the present invention. FIG. 5A is an explanatory view showing a magnification chromatic aberration, FIG. 5B is an explanatory view showing a field curvature aberration, and FIG. 5C is an explanatory view showing a distortion aberration. FIGS. 6A, 6B, 6C, 6D and 6E are explanatory views showing lateral aberrations of a wide angle lens in accordance with the second embodiment of the present invention. FIGS. 6A, 6B, 6C, 6D and 6E show lateral aberrations in a tangential direction ("Y" direction) and a sagittal direction ("X" direction) at angles of 0°, 24.32°, 47.26°, 70.56° and 97.23° with respect to an optical axis.

As shown in FIG. 4A, a wide angle lens 100 in this embodiment is, similarly to the first embodiment, also provided with a lens constitution of five groups having six lenses. In the wide angle lens 100, a first lens 110, a second lens 120, a third lens 130, a diaphragm 190, a fourth lens 140, a fifth lens 150 and a sixth lens 160 are disposed along an optical axis "L" from an object side "L1" to an image side "L2". Further, a filter 181 and an imaging element 182 are disposed to the image side "L2" of the sixth lens 160.

The first lens 110 which is a lens having a negative power with a convex surface (first face 1) on the object side "L1" and a concave surface (second face 2) on the image side "L2". In this embodiment, the first lens 110 is a plastic lens whose first face 1 is a spherical surface and its second face 2 is an aspherical surface.

The second lens 120 is a lens having a negative power with a concave surface (fourth face 4) on the image side "L2". In this embodiment, a convex surface (third face 3) of the second lens 120 is directed to the object side "L1" and the second lens 120 is a plastic lens whose third face 3 and fourth face 4 are aspherical surfaces.

The third lens 130 is a lens having a positive power with a convex surface (sixth face 6) on the image side "L2". In this embodiment, a concave surface (fifth face 5) of the third lens 130 is directed to the object side "L1" and the third lens 130 is a plastic lens whose fifth face 5 and sixth face 6 are aspherical surfaces.

The fourth lens 140 is a lens having a positive power with a convex surface (ninth face) on the image side "L2". In this embodiment, a convex surface (eighth face 8) of the fourth lens 140 is directed to the object side "L1" and the fourth lens 140 is a plastic lens whose eighth face 8 and ninth face 9 are aspherical surfaces.

The fifth lens 150 is a plastic lens having a negative power with a concave surface (tenth face 10) on the object side "L1" and a concave surface (eleventh face 11) on the image side "L2". The fifth lens 150 constitutes a cemented lens 170 together with the sixth lens 160.

The sixth lens 160 is a plastic lens having a positive power with a convex surface (eleventh face 11) on the object side "L1" and a convex surface (twelfth face 12) on the image side "L2". In this embodiment, the tenth face 10, the eleventh face 11 and the twelfth face 12 of the cemented lens 170 (fifth lens 150 and sixth lens 160) are aspherical surfaces.

Respective faces ("Surf") are constituted as shown in FIGS. 4B and 4C. In the wide angle lens 100, an effective focal length "f0" of the entire lens system is 1.047 mm and an object-image distance "D" from the face (first face 1) on the object side "L1" of the first lens 110 to the imaging element 182 is 13.982 mm. Further, the "F"-value of the wide angle lens 100 is 2.0, the maximum viewing angle is 213°, and the horizontal viewing angle is 194°.

Further, the wide angle lens 100 satisfies the following conditions (1) through (5). First, the effective focal length "f0", a focal length "f3" of the third lens 130, and a focal length "f5" of the fifth lens 150 are respectively 1.047 mm, 10.006 mm, and −1.522 mm. Therefore, "f3/f0" is 9.557 and "f5/f0" is −1.454. Accordingly, both of the following conditions (1) and (2) are satisfied.

$6<f3/f0<12$      Condition (1)

$-1.5<f5/f0<-1$      Condition (2)

Therefore, the second lens 120 is easy to be manufactured and, in addition, chromatic aberration is easy to be corrected.

Further, the Abbe number "ν3" of the third lens 130 and the Abbe number "ν4" of the fourth lens 140 are respectively 30.2 and 55.8. Therefore, both of the following conditions (3) and (4) are satisfied.

$ν3 \leq 35$      Condition (3)

$νν4 \geq 50$      Condition (4)

Accordingly, in this embodiment, chromatic aberration is easy to be corrected.

Further, the object-image distance "D" is 13.982 mm and thus "D/f0" is 13.354. Therefore, the following condition (5) is satisfied.

$10<D/f0<15$      Condition (5)

Therefore, it is advantageous to constitute a small wide angle lens 100.

Further, the Abbe number "ν5" of the fifth lens 150 and the Abbe number "ν6" of the sixth lens 160 are respectively 24.0 and 55.8. Therefore, both of the following condition (6) and condition (7) are satisfied.

$ν5 \leq 35$      Condition (6)

$ν6 \geq 40$      Condition (7)

Therefore, chromatic aberration is easy to be corrected.

Further, since a concave surface (tenth face 10) of the fifth lens 150 is directed to the object side "L1", the chromatic aberration is easy to be corrected.

The aberrations (magnification chromatic aberration, field curvature aberration, distortion aberration and lateral aberration) of the wide angle lens 100 in this embodiment are shown in FIGS. 5A, 5B and 5C and FIGS. 6A, 6B, 6C, 6D and 6E. The aberrations are reduced in a sufficient level. In other words, in this embodiment, the fourth lens 140 having a positive power is disposed to the rear side (image side "L2") of the diaphragm 190 and at a position adjacent to the diaphragm 190 and thus, even at a wide angle, comatic aberration, astigmatism, chromatic aberration and the like can be corrected. Further, since the fourth lens 140 having a positive power is disposed to the rear side (image side "L2") of the diaphragm 190 and at a position adjacent to the diaphragm 190, an incident angle to the image plane can be suppressed small. Therefore, a high-pixel imaging element 182 can be utilized. In addition, the fifth group is the cemented lens 170 of the fifth lens 150 having both concave surfaces and the sixth lens 160 having both convex surfaces and thus, it is advantageous to correct magnification chromatic aberration. Therefore, generation of magnification chromatic aberration resulting from a wider angle can be suppressed. Also in this case, the fourth lens 140 is disposed between the diaphragm 190 and the cemented lens 170 and thus the absolute value of a radius of curvature of the cemented face (eleventh face 11) of a plastic lens (fifth lens 150 and sixth lens 160) constituting the cemented lens 170 can be made relatively large. Therefore, the cemented lens 170 is easily manufactured.

In addition, in this embodiment, all of the first lens 110, the second lens 120, the third lens 130, the fourth lens 140, the fifth lens 150 and the sixth lens 160 are plastic lenses. Therefore, the cost of the wide angle lens 100 can be reduced.

[Third Embodiment]

Figures 7A, 7B, 7C:
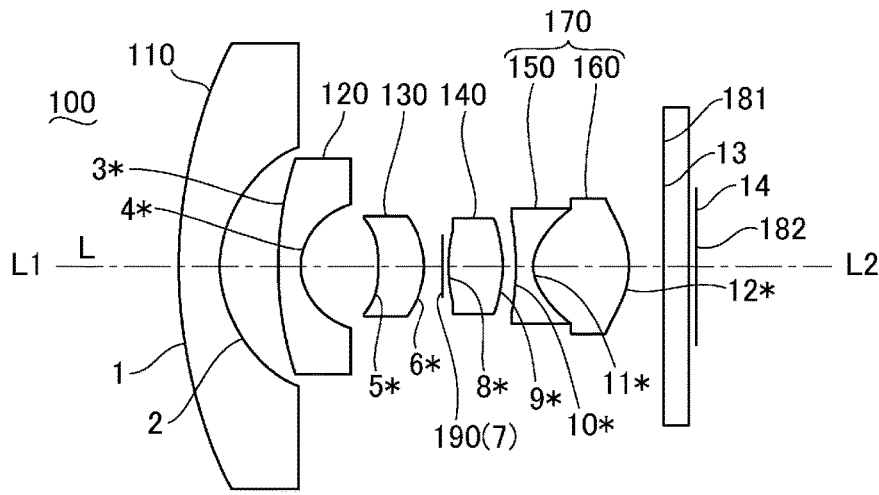
FIGS. 7A, 7B and 7C are explanatory views showing a wide angle lens in accordance with a third embodiment of the present invention.
Figure 8A:
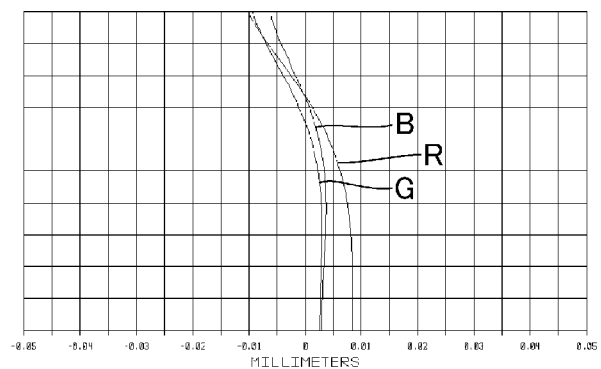
FIGS. 8A, 8B and 8C are explanatory views showing aberrations of a wide angle lens in accordance with the third embodiment of the present invention.
Figure 8B:
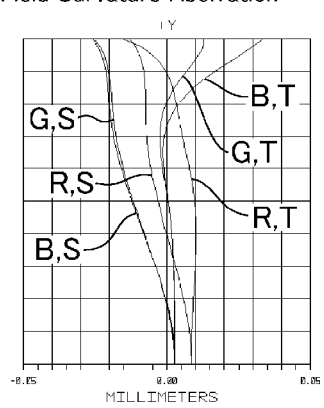
Figure 8C:
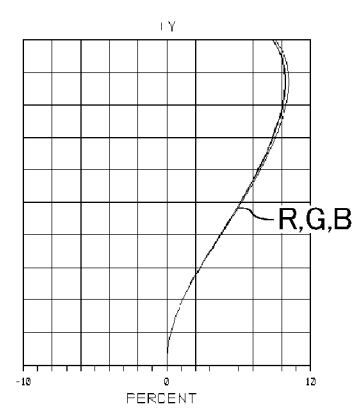
Figure 9A:
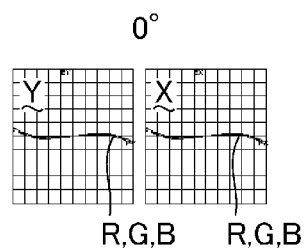
FIGS. 9A, 9B, 9C, 9D, 9E and 9F are explanatory views showing lateral aberrations of a wide angle lens in accordance with the third embodiment of the present invention.
Figure 9B:
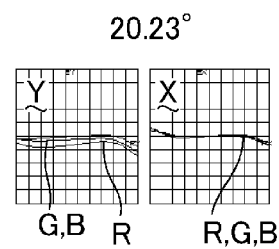
Figure 9C:
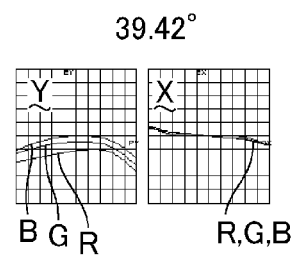
Figure 9D:
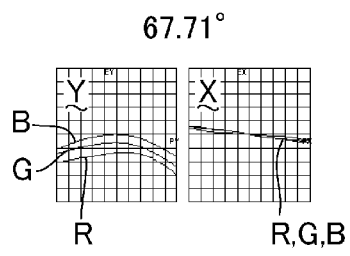
Figure 9E:
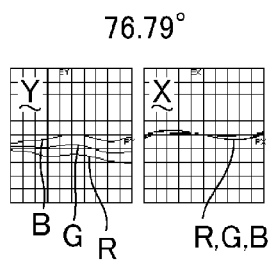
Figure 9F:
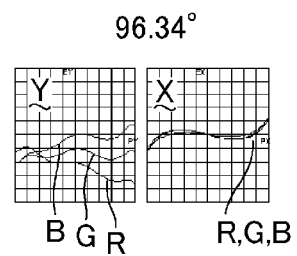

FIGS. 7A, 7B and 7C are explanatory views showing a wide angle lens in accordance with a third embodiment of the present invention. FIG. 7A is an explanatory view showing a lens constitution, FIG. 7B is an explanatory view showing physical properties of respective faces, and FIG. 7C is an explanatory view showing aspherical coefficients of respective faces. FIGS. 8A, 8B and 8C are explanatory views showing aberrations of a wide angle lens in accordance with the third embodiment of the present invention. FIG. 8A is an explanatory view showing a magnification chromatic aberration, FIG. 8B is an explanatory view showing a field curvature aberration, and FIG. 8C is an explanatory view showing a distortion aberration. FIGS. 9A, 9B, 9C, 9D, 9E and 9F are explanatory views showing lateral aberrations of a wide angle lens in accordance with the third embodiment of the present invention. FIGS. 9A, 9B, 9C, 9D, 9E and 9F show lateral aberrations in a tangential direction ("Y" direction) and a sagittal direction ("X" direction) at angles of 0°, 20.23°, 39.42°, 67.71°, 76.79° and 96.34° with respect to an optical axis.

As shown in FIG. 7A, a wide angle lens 100 in this embodiment is, similarly to the first and second embodiments, also provided with a lens constitution of five groups having six lenses. In the wide angle lens 100, a first lens 110, a second lens 120, a third lens 130, a diaphragm 190, a fourth lens 140, a fifth lens 150 and a sixth lens 160 are disposed along an optical axis "L" from an object side "L1" to an image side "L2". Further, a filter 181 and an imaging element 182 are disposed to the image side "L2" of the sixth lens 160.

The first lens 110 which is a first lens from the object side "L1" is a lens having a negative power with a convex surface (first face 1) on the object side "L1" and a concave surface (second face 2) on the image side "L2". In this embodiment, the first lens 110 is a glass lens whose first face 1 and second face 2 are spherical surfaces.

The second lens 120 which is a second lens from the object side "L1" is a lens having a negative power with a concave surface (fourth face 4) on the image side "L2". In this embodiment, a convex surface (third face 3) of the second lens 120 is directed to the object side "L1" and the second lens 120 is a plastic lens whose third face 3 and fourth face 4 are aspherical surfaces.

The third lens 130 which is a third lens from the object side "L1" is a lens having a positive power with a convex surface (sixth face 6) on the image side "L2". In this embodiment, a concave surface (fifth face 5) of the third lens 130 is directed to the object side "L1" and the third lens 130 is a plastic lens whose fifth face 5 and sixth face 6 are aspherical surfaces.

The fourth lens 140 which is a fourth lens from the object side "L1" is a lens having a positive power with a convex surface (ninth face) on the image side "L2". In this embodiment, a convex surface (eighth face 8) of the fourth lens 140 is directed to the object side "L1" and the fourth lens 140 is a glass lens whose eighth face 8 and ninth face 9 are aspherical surfaces.

The fifth lens 150 which is a fifth lens from the object side "L1" is a plastic lens having a negative power with a concave surface (tenth face 10) on the object side "L1" and a concave surface (eleventh face 11) on the image side "L2". The fifth lens 150 constitutes a cemented lens 170 together with the sixth lens 160 which is a sixth lens from the object side "L1".

The sixth lens 160 is a plastic lens having a positive power with a convex surface (eleventh face 11) on the object side "L1" and a convex surface (twelfth face 12) on the image side "L2". In this embodiment, the tenth face 10, the eleventh face 11 and the twelfth face 12 of the cemented lens 170 (fifth lens 150 and sixth lens 160) are aspherical surfaces.

Respective faces ("Surf") are constituted as shown in FIGS. 7B and 7C. In the wide angle lens 100, an effective focal length "f0" of the entire lens system is 1.259 mm and an object-image distance "D" from the face (first face 1) on the object side "L1" of the first lens 110 to the imaging element 182 is 16.333 mm. Further, the "F"-value of the wide angle lens 100 is 2.0, the maximum viewing angle is 201° and the horizontal viewing angle is 191°.

Further, the wide angle lens 100 satisfies the following conditions (1) through (5). First, the effective focal length "f0", a focal length "f3" of the third lens 130 and a focal length "f5" of the fifth lens 150 are respectively 1.259 mm, 9.321 mm and −1.836 mm. Therefore, "f3/f0" is 7.403 and "f5/f0" is −1.458. Accordingly, both of the following conditions (1) and (2) are satisfied.

$$6 < f3/f0 < 12 \quad \text{Condition (1)}$$

$$-1.5 < f5/f0 < -1 \quad \text{Condition (2)}$$

Therefore, the second lens 120 is easy to be manufactured and, in addition, chromatic aberration is easy to be corrected.

Further, the Abbe number "ν3" of the third lens 130 and the Abbe number "ν4" of the fourth lens 140 are respectively 24.0 and 63.9. Therefore, both of the following conditions (3) and (4) are satisfied.

$$\nu 3 \leq 35 \quad \text{Condition (3)}$$

$$\nu\nu 4 \geq 50 \quad \text{Condition (4)}$$

Accordingly, in this embodiment, chromatic aberration is easy to be corrected.

Further, the object-image distance "D" is 16.333 mm and thus "D/f0" is 12.973. Therefore, the following condition (5) is satisfied.

$$10 < D/f0 < 15 \quad \text{Condition (5)}$$

Accordingly, it is advantageous to constitute a small wide angle lens 100.

Further, the Abbe number "ν5" of the fifth lens 150 and the Abbe number "ν6" of the sixth lens 160 are respectively 24.0 and 55.8. Therefore, both of the following condition (6) and condition (7) are satisfied.

$$\nu 5 \leq 35 \quad \text{Condition (6)}$$

$$\nu 6 \geq 40 \quad \text{Condition (7)}$$

Accordingly, chromatic aberration is easy to be corrected.

Further, since a concave surface (tenth face 10) of the fifth lens 150 is directed to the object side "L1", the chromatic aberration is easy to be corrected.

The aberrations (magnification chromatic aberration, field curvature aberration, distortion aberration and lateral aberration) of the wide angle lens 100 in this embodiment are shown in FIGS. 8A, 8B and 8C and FIGS. 9A, 9B, 9C, 9D, 9E and 9F. The aberrations are reduced in a sufficient level. In other words, in this embodiment, the fourth lens 140 having a positive power is disposed to the rear side (image side "L2") of the diaphragm 190 and at a position adjacent to the diaphragm 190 and thus, even at a wide angle, comatic aberration, astigmatism, chromatic aberration and the like can be corrected. Further, since the fourth lens 140 having a positive power is disposed to the rear side (image side "L2") of the diaphragm 190 and at a position adjacent to the diaphragm 190, an incident angle to the image plane can be suppressed small. Therefore, a high-pixel imaging element 182 can be utilized. In addition, the fifth group is the cemented lens 170 of the fifth lens 150 having both concave surfaces and the sixth lens 160 having both convex surfaces and thus, it is advantageous to correct magnification chromatic aberration. Therefore, generation of magnification chromatic aberration resulting from a wider angle can be suppressed. Also in this case, the fourth lens 140 is disposed between the diaphragm 190 and the cemented lens 170 and thus the absolute value of a radius of curvature of the cemented face (eleventh face 11) of a plastic lens (fifth lens 150 and sixth lens 160) constituting the cemented lens 170 can be made relatively large. Therefore, the cemented lens 170 is easily manufactured.

In addition, in the wide angle lens 100 in this embodiment, the fourth lens 140 disposed to the rear side (image side "L2") of the diaphragm 190 and at a position adjacent to the diaphragm 190 is a glass lens. Therefore, lowering of resolution and change of an image height due to temperature change can be suppressed.

[Fourth Embodiment]

Figures 10A, 10B, 10C:
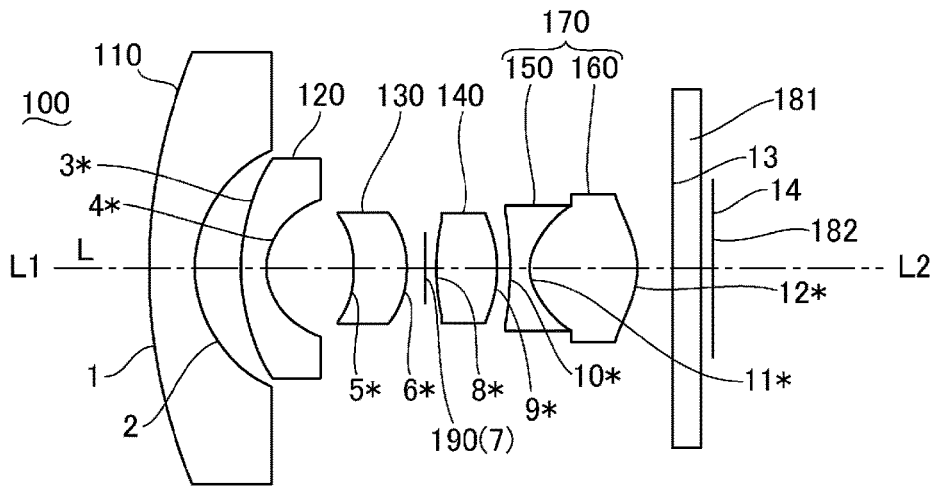
FIGS. 10A, 10B and 10C are explanatory views showing a wide angle lens in accordance with a fourth embodiment of the present invention.
Figure 11A:
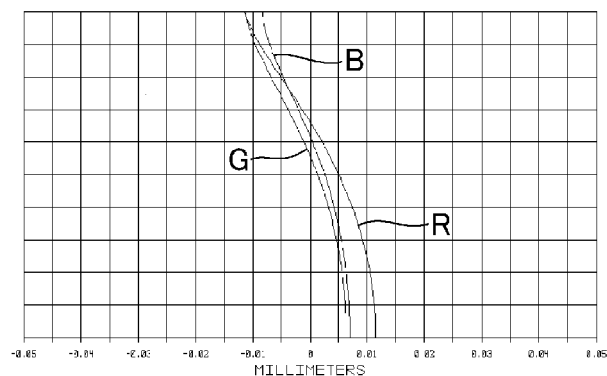
FIGS. 11A, 11B and 11C are explanatory views showing aberrations of a wide angle lens in accordance with the fourth embodiment of the present invention.
Figure 11B:
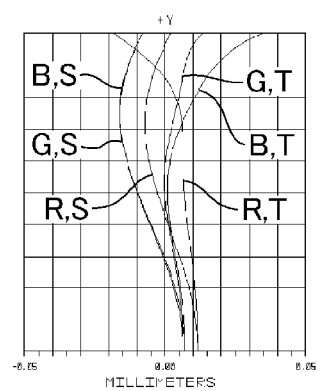
Figure 11C:
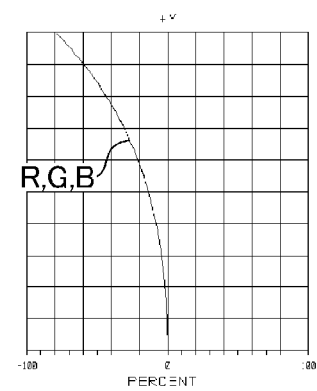
Figure 12A:
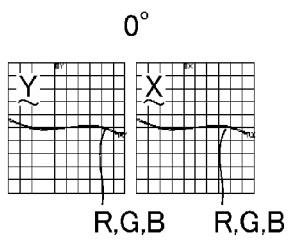
FIGS. 12A, 12B, 12C, 12D, 12E and 12F are explanatory views showing lateral aberrations of a wide angle lens in accordance with the fourth embodiment of the present invention.
Figure 12B:
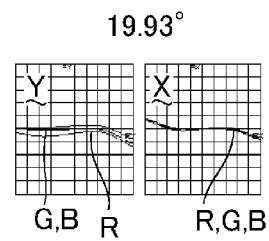
Figure 12C:
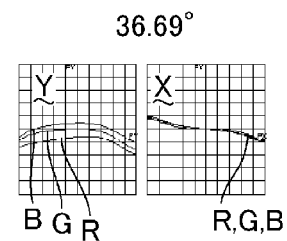
Figure 12D:
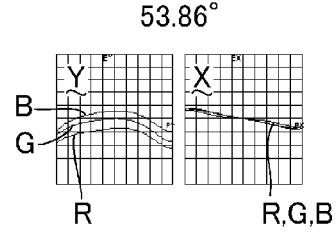
Figure 12E:
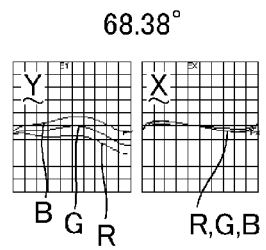
Figure 12F:
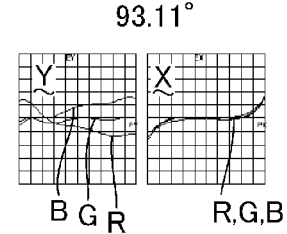

FIGS. 10A, 10B and 10C are explanatory views showing a wide angle lens in accordance with a fourth embodiment of the present invention. FIG. 10A is an explanatory view showing a lens constitution, FIG. 10B is an explanatory view showing physical properties of respective faces, and FIG. 10C is an explanatory view showing aspherical coefficients of respective faces. FIGS. 11A, 11B and 11C are explanatory views showing aberrations of a wide angle lens in accordance with the fourth embodiment of the present invention. FIG. 11A is an explanatory view showing a magnification chromatic aberration, FIG. 11B is an explanatory view showing a field curvature aberration and FIG. 11C is an explanatory view showing a distortion aberration.

FIGS. 12A, 12B, 12C, 12D, 12E and 12F are explanatory views showing lateral aberrations of a wide angle lens in accordance with the fourth embodiment of the present invention. FIGS. 12A, 12B, 12C, 12D, 12E and 12F show lateral aberrations in a tangential direction ("Y" direction) and a sagittal direction ("X" direction) at angles of 0°, 19.93°, 36.69°, 53.86°, 68.38° and 93.11° with respect to an optical axis.

As shown in FIG. 10A, a wide angle lens 100 in this embodiment is, similarly to the first, second and third embodiments, also provided with a lens constitution of five groups having six lenses. In the wide angle lens 100, a first lens 110, a second lens 120, a third lens 130, a diaphragm 190, a fourth lens 140, a fifth lens 150 and a sixth lens 160 are disposed along an optical axis "L" from an object side "L1" to an image side "L2". Further, a filter 181 and an imaging element 182 are disposed to the image side "L2" of the sixth lens 160.

The first lens 110 which is a first lens from the object side "L1" is a lens having a negative power with a convex surface (first face 1) on the object side "L1" and a concave surface (second face 2) on the image side "L2". In this embodiment, the first lens 110 is a glass lens whose first face 1 and second face 2 are spherical surfaces.

The second lens 120 which is a second lens from the object side "L1" is a lens having a negative power with a concave surface (fourth face 4) on the image side "L2". In this embodiment, a convex surface (third face 3) of the second lens 120 is directed to the object side "L1" and the second lens 120 is a plastic lens whose third face 3 and fourth face 4 are aspherical surfaces.

The third lens 130 which is a third lens from the object side "L1" is a lens having a positive power with a convex surface (sixth face 6) on the image side "L2". In this embodiment, a concave surface (fifth face 5) of the third lens 130 is directed to the object side "L1" and the third lens 130 is a plastic lens whose fifth face 5 and sixth face 6 are aspherical surfaces.

The fourth lens 140 which is a fourth lens from the object side "L1" is a lens having a positive power with a convex surface (ninth face 9) on the image side "L2". In this embodiment, a convex surface (eighth face 8) of the fourth lens 140 is directed to the object side "L1" and the fourth lens 140 is a glass lens whose eighth face 8 and ninth face 9 are aspherical surfaces.

The fifth lens 150 which is a fifth lens from the object side "L1" is a plastic lens having a negative power with a concave surface (tenth face 10) on the object side "L1" and a concave surface (eleventh face 11) on the image side "L2". The fifth lens 150 constitutes a cemented lens 170 together with the sixth lens 160 which is a sixth lens from the object side "L1".

The sixth lens 160 is a plastic lens having a positive power with a convex surface (eleventh face 11) on the object side "L1" and a convex surface (twelfth face 12) on the image side "L2". In this embodiment, the tenth face 10, the eleventh face 11 and the twelfth face 12 of the cemented lens 170 (fifth lens 150 and sixth lens 160) are aspherical surfaces.

Respective faces ("Surf") are constituted as shown in FIGS. 10B and 10C. In the wide angle lens 100, an effective focal length "f0" of the entire lens system is 1.344 mm and an object-image distance "D" from the face (first face 1) on the object side "L1" of the first lens 110 to the imaging element 182 is 15.762 mm. Further, the "F"-value of the wide angle lens 100 is 2.0, the maximum viewing angle is 173° and the horizontal viewing angle is 166°.

Further, the wide angle lens 100 satisfies the following conditions (1) through (5). First, the effective focal length "f0", a focal length "f3" of the third lens 130 and a focal length "f5" of the fifth lens 150 are respectively 1.344 mm, 9.393 mm and −1.914 mm. Therefore, "f3/f0" is 6.989 and "f5/f0" is −1.424. Accordingly, both of the following conditions (1) and (2) are satisfied.

$6 < f3/f0 < 12$      Condition (1)

$-1.5 < f5/f0 < -1$      Condition (2)

Therefore, the second lens 120 is easy to be manufactured and, in addition, chromatic aberration is easy to be corrected.

Further, the Abbe number "v3" of the third lens 130 and the Abbe number "v4" of the fourth lens 140 are respectively 24.0 and 63.9. Therefore, both of the following conditions (3) and (4) are satisfied.

$v3 \leq 35$      Condition (3)

$v4 \geq 50$      Condition (4)

Accordingly, in this embodiment, chromatic aberration is easy to be corrected.

Further, the object-image distance "D" is 15.762 mm and thus "D/f0" is 11.728. Therefore, the following condition (5) is satisfied.

$10 < D/f0 < 15$      Condition (5)

Accordingly, it is advantageous to constitute a small wide angle lens 100.

Further, the Abbe number "v5" of the fifth lens 150 and the Abbe number "v6" of the sixth lens 160 are respectively 24.0 and 55.8. Therefore, both of the following condition (6) and condition (7) are satisfied.

$v5 \leq 35$      Condition (6)

$v6 \geq 40$      Condition (7)

Accordingly, chromatic aberration is easy to be corrected.

Further, since a concave surface (tenth face 10) of the fifth lens 150 is directed to the object side "L1", the chromatic aberration is easy to be corrected.

The aberrations (magnification chromatic aberration, field curvature aberration, distortion aberration and lateral aberration) of the wide angle lens 100 in this embodiment are shown in FIGS. 11A, 11B and 11C and FIGS. 12A, 12B, 12C, 12D, 12E and 12F. The aberrations are reduced in a sufficient level. In other words, in this embodiment, the fourth lens 140 having a positive power is disposed to the rear side (image side "L2") of the diaphragm 190 and at a position adjacent to the diaphragm 190 and thus, even at a wide angle, comatic aberration, astigmatism, chromatic aberration and the like can be corrected. Further, since the fourth lens 140 having a positive power is disposed to the rear side (image side "L2") of the diaphragm 190 and at a position adjacent to the diaphragm 190, an incident angle to the image plane can be suppressed small. Therefore, a high-pixel imaging element 182 can be utilized. In addition, the fifth group is the cemented lens 170 constituted of the fifth lens 150 having both concave surfaces and the sixth lens 160 having both convex surfaces and thus, it is advantageous to correct magnification chromatic aberration. Therefore, generation of magnification chromatic aberration resulting from a wider angle can be suppressed. Also in this case, the fourth lens 140 is disposed between the diaphragm 190 and the cemented lens 170 and thus the absolute value of a radius of curvature of the cemented face (eleventh face 11) of a plastic lens (fifth lens 150 and sixth lens 160) constituting the cemented lens 170 can be made relatively large. Therefore, the cemented lens 170 is easily manufactured.

In addition, in the wide angle lens 100 in this embodiment, the fourth lens 140 disposed to the rear side (image side "L2") of the diaphragm 190 and at a position adjacent to the diaphragm 190 is a glass lens. Therefore, lowering of resolution and change of an image height due to temperature change can be suppressed.

[Other Embodiments]

In the embodiment described above, in the condition (3), the Abbe number "v3" of the third lens 130 is preferably set to be 35 or less (v3≤35). However, when the Abbe number "v3" of the third lens 130 is set to be 30 or less (v3≤30), the chromatic aberration can be further corrected. Further, in the condition (4), the Abbe number "v4" of the fourth lens 140 is preferably set to be 50 or more (v4≥50). However, when the Abbe number "v4" of the fourth lens 140 is set to be 60 or more (v4≥60), the chromatic aberration can be further corrected. Further, in the condition (6), the Abbe number "v5" of the fifth lens 150 is preferably set to be 35 or less (v5≤35). However, when the Abbe number "v5" of the fifth lens 150 is set to be 30 or less (v5≤30), the chromatic aberration can be further corrected.

While the description above refers to particular embodiments of the present invention, it will be understood that many modifications may be made without departing from the spirit thereof. The accompanying claims are intended to cover such modifications as would fall within the true scope and spirit of the present invention.

The presently disclosed embodiments are therefore to be considered in all respects as illustrative and not restrictive, the scope of the invention being indicated by the appended claims, rather than the foregoing description, and all changes which come within the meaning and range of equivalency of the claims are therefore intended to be embraced therein.

What is claimed is:

1. A wide angle lens comprising:
   a first lens which comprising a first lens convex surface directed to an object side and a first lens concave surface directed to an image side, the first lens having a negative power;
   a second lens provided on the image side of the first lens, the second lens comprising a second lens concave surface directed to the image side, the second lens having a negative power;
   a third lens provided on the image side of the second lens, the third lens comprising a third lens convex surface directed to the image side, the third lens having a positive power;
   a fourth lens provided on the image side of the third lens, the fourth lens comprising a fourth lens convex surface directed to the image side, the fourth lens having a positive power;
   a fifth lens provided on the image side of the fourth lens, the fifth lens comprising a first fifth lens concave surface directed to the object side and a second fifth lens concave surface directed to the image side, the fifth lens being a plastic lens having a negative power;
   a sixth lens provided on the image side of the fifth lens, the sixth lens comprising a first sixth lens convex surface directed to the object side and a second sixth lens convex surface is directed to the image side, the sixth lens being a plastic lens having a positive power; and
   a diaphragm disposed between the third lens and the fourth lens;

wherein the fifth lens and the sixth lens constitute a cemented lens; wherein the wide angle lens is a fixed focal length lens; and wherein the wide angle lens satisfies the following conditions (1) and (2):

$$6.0 < f3/f0 < 12.0 \quad \text{Condition (1)}$$

$$1.5 < f5/f0 < -1.0 \quad \text{Condition (2)}$$

wherein an effective focal length of the entire wide angle lens is "f0", a focal length of the third lens is "f3" and a focal length of the fifth lens is "f5".

2. The wide angle lens according to claim 1, wherein the wide angle lens satisfies the following conditions (3) and (4):

$$v3 \leq 35 \quad \text{Condition (3)}$$

$$v4 \geq 50 \quad \text{Condition (4)}$$

wherein an Abbe number of the third lens is "v3" and an Abbe number of the fourth lens is "v4".

3. The wide angle lens according to claim 2, wherein the fourth lens is a glass lens.

4. The wide angle lens according to claim 1, wherein the third lens comprises a third lens concave surface directed to the object side.

5. A wide angle lens comprising:
a first lens which comprising a first lens convex surface directed to an object side and a first lens concave surface directed to an image side, the first lens having a negative power;
a second lens provided on the image side of the first lens, the second lens comprising a second lens concave surface directed to the image side, the second lens having a negative power;
a third lens provided on the image side of the second lens, the third lens comprising a third lens convex surface directed to the image side, the third lens having a positive power;
a fourth lens provided on the image side of the third lens, the fourth lens comprising a fourth lens convex surface directed to the image side, the fourth lens having a positive power;
a fifth lens provided on the image side of the fourth lens, the fifth lens comprising a first fifth lens concave surface directed to the object side and a second fifth lens concave surface directed to the image side, the fifth lens being a plastic lens having a negative power;
a sixth lens provided on the image side of the fifth lens, the sixth lens comprising a first sixth lens convex surface directed to the object side and a second sixth lens convex surface is directed to the image side, the sixth lens being a plastic lens having a positive power; and
a diaphragm disposed between the third lens and the fourth lens;
wherein the fifth lens and the sixth lens constitute a cemented lens; wherein the wide angle lens is a fixed focal length lens; and
wherein the wide angle lens satisfies the following condition (5):

$$10.0 < D/f0 < 15.0 \quad \text{Condition (5)}$$

wherein an object-image distance from a face on the object side of the first lens to an imaging element is "D" and an effective focal length of the entire wide-angle lens is "f0".

6. The wide angle lens according to claim 5, wherein the wide angle lens satisfies the following conditions (1) and (2):

$$6 < f3/f0 < 12 \quad \text{Condition (1)}$$

$$-1.5 < f5/f0 < -1 \quad \text{Condition (2)}$$

wherein a focal length of the third lens is "f3" and a focal length of the fifth lens is "f5".

7. The wide angle lens according to claim 6, wherein the wide angle lens satisfies the following conditions (3) and (4):

$$v3 \leq 35 \quad \text{Condition (3)}$$

$$v4 \geq 50 \quad \text{Condition (4)}$$

wherein an Abbe number of the third lens is "v3" and an Abbe number of the fourth lens is "v4".

8. The wide angle lens according to claim 7, wherein the fourth lens is a glass lens.

9. The wide angle lens according to claim 7, wherein the third lens comprises a third lens concave surface directed to the object side.

* * * * *